(12) United States Patent
Kaidar et al.

(10) Patent No.: US 12,231,156 B2
(45) Date of Patent: *Feb. 18, 2025

(54) TECHNIQUES FOR CONTROLLING SPECIFIC ABSORPTION RATE OF RADIO ENERGY TRANSMISSION

(71) Applicant: Apple Inc., Cupertino, CA (US)

(72) Inventors: Oren Kaidar, Binyamina (IL); Ehud Reshef, Qiryat Tivon (IL); Nir Balaban, Tel Aviv (IL); Wilfrid D'Angelo, Mougins (FR); Yuval Elad, Petach-Tikva (IL)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,275

(22) Filed: May 10, 2023

(65) Prior Publication Data
US 2023/0361798 A1 Nov. 9, 2023

Related U.S. Application Data

(63) Continuation of application No. 17/175,858, filed on Feb. 15, 2021, now Pat. No. 11,689,234, which is a
(Continued)

(30) Foreign Application Priority Data

May 11, 2018 (EP) ..................... 18171855

(51) Int. Cl.
*H04B 1/3827* (2015.01)
*H04W 52/36* (2009.01)

(52) U.S. Cl.
CPC ........ *H04B 1/3838* (2013.01); *H04W 52/367* (2013.01)

(58) Field of Classification Search
CPC ... H04W 52/30; H04W 52/36; H04W 52/367; H04B 1/3827; H04B 1/3838
See application file for complete search history.

(56) References Cited

U.S. PATENT DOCUMENTS

| | | | |
|---|---|---|---|
| 10,924,146 B2 * | 2/2021 | Kaidar | ................ H04B 1/3838 |
| 11,689,234 B2 * | 6/2023 | Kaidar | ................ H04W 52/44 |
| | | | 455/127.1 |

(Continued)

OTHER PUBLICATIONS

Notice of Allowance dated Jan. 31, 2020 in connection with U.S. Appl. No. 16/381,554.
(Continued)

*Primary Examiner* — Justin Y Lee
(74) *Attorney, Agent, or Firm* — Kubota & Basol LLP

(57) ABSTRACT

The disclosure relates to techniques for controlling Specific Absorption Rate (SAR) of radio energy transmission. In particular, the disclosure relates to a radio device and a method for controlling radio energy transmission of a plurality of radio entities to comply with a predefined SAR requirement. Such a radio device includes: a plurality of radio entities configured to transmit radio energy; and a controller configured to control the radio energy transmission of the plurality of radio entities to comply with a predefined Specific Absorption Rate, SAR, requirement, wherein the controller is configured to enable at least two radio entities of the plurality of radio entities operating concurrently based on a shared SAR transmission power restriction which allows the at least two radio entities transmitting concurrently at a predefined duty cycle, in particular at 100% duty cycle, without violating the SAR requirement. The disclosure further relates to a method for dynamic management of a SAR budget across multiple radio entities.

20 Claims, 7 Drawing Sheets

Related U.S. Application Data continuation of application No. 16/381,554, filed on Apr. 11, 2019, now Pat. No. 10,924,146.

(56) References Cited

U.S. PATENT DOCUMENTS

| | | |
|---|---|---|
| 2011/0222469 A1 | 9/2011 | Ali |
| 2012/0021707 A1* | 1/2012 | Forrester ............... H04W 52/30 455/115.3 |
| 2012/0071195 A1 | 3/2012 | Chakraborty |
| 2014/0187281 A1 | 7/2014 | Faraone |
| 2014/0200046 A1 | 7/2014 | Sikri |
| 2015/0031468 A1 | 1/2015 | Matsunaga |
| 2015/0072721 A1 | 3/2015 | Lagnado |
| 2016/0174162 A1 | 6/2016 | Nadakuduti |
| 2016/0174168 A1 | 6/2016 | Lu |
| 2017/0265148 A1 | 9/2017 | Balasubramanian |
| 2017/0332333 A1 | 11/2017 | Santhanam |
| 2018/0070320 A1 | 3/2018 | Forrester |

OTHER PUBLICATIONS

Non-Final Office Action dated Aug. 22, 2019 in connection with U.S. Appl. No. 16/381,554.
European Patent Office; European Search Report issued for EP1817855.2; 14 Pages; dated Oct. 23, 2018.
Notice of Allowance dated Feb. 10, 2023 in connection with U.S. Appl. No. 17/175,858.
Non-Final Office Action dated Dec. 20, 2021 in connection with U.S. Appl. No. 17/175,858.
Final Office Action dated Apr. 15, 2022 in connection with U.S. Appl. No. 17/175,858.
Final Office Action dated Dec. 1, 2022 in connection with U.S. Appl. No. 17/175,858.

* cited by examiner

TECHNIQUES FOR CONTROLLING SPECIFIC ABSORPTION RATE OF RADIO ENERGY TRANSMISSION

This application is a Continuation of U.S. patent application Ser. No. 17/175,858 filed Feb. 15, 2021, which is a continuation of U.S. patent application Ser. No. 16/381,554 filed Apr. 11, 2019, (now U.S. Pat. No. 10,924,146 issued on Feb. 16, 2021) entitled TECHNIQUES FOR CONTROLLING SPECIFIC ABSORPTION RATE OF RADIO ENERGY TRANSMISSION, which claims priority to European Patent Application 18171855.2 filed May 11, 2018 and is hereby incorporated by reference in its entirety.

FIELD

The disclosure relates to techniques for controlling Specific Absorption Rate (SAR) of radio energy transmission. In particular, the disclosure relates to a radio device and a method for controlling radio energy transmission of a plurality of radio entities to comply with a predefined SAR requirement. The disclosure further relates to a method for dynamic management of a SAR budget across multiple radio entities.

BACKGROUND

SAR—Specific Absorption Rate, is a measure of the amount of RF energy absorbed by the body when using a mobile device such a phone or a tablet. In order to comply with SAR requirements a restriction (e.g. a backoff or another kind of reduction) shall be applied on the maximal TX power permitted for a specific radio of the device. Note that the SAR requirement is for the maximum allowed transmission (Tx) power; a backoff is one way to relate to this restriction in the context of backoff from maximum (HW supported) Tx power. Other ways to relate to this restriction are applicable as well. When the device has an antenna capable of transmitting concurrently at multiple frequency bands or if it has multiple radios that emit energy in close physical proximity such that the SAR restriction is applied on all of them together an additional backoff must be taken on the TX power of each radio entity. The resulting TX power from all applied backoffs degrades the wireless performance for each participating radio. The disclosure presents a solution to the above described problem.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
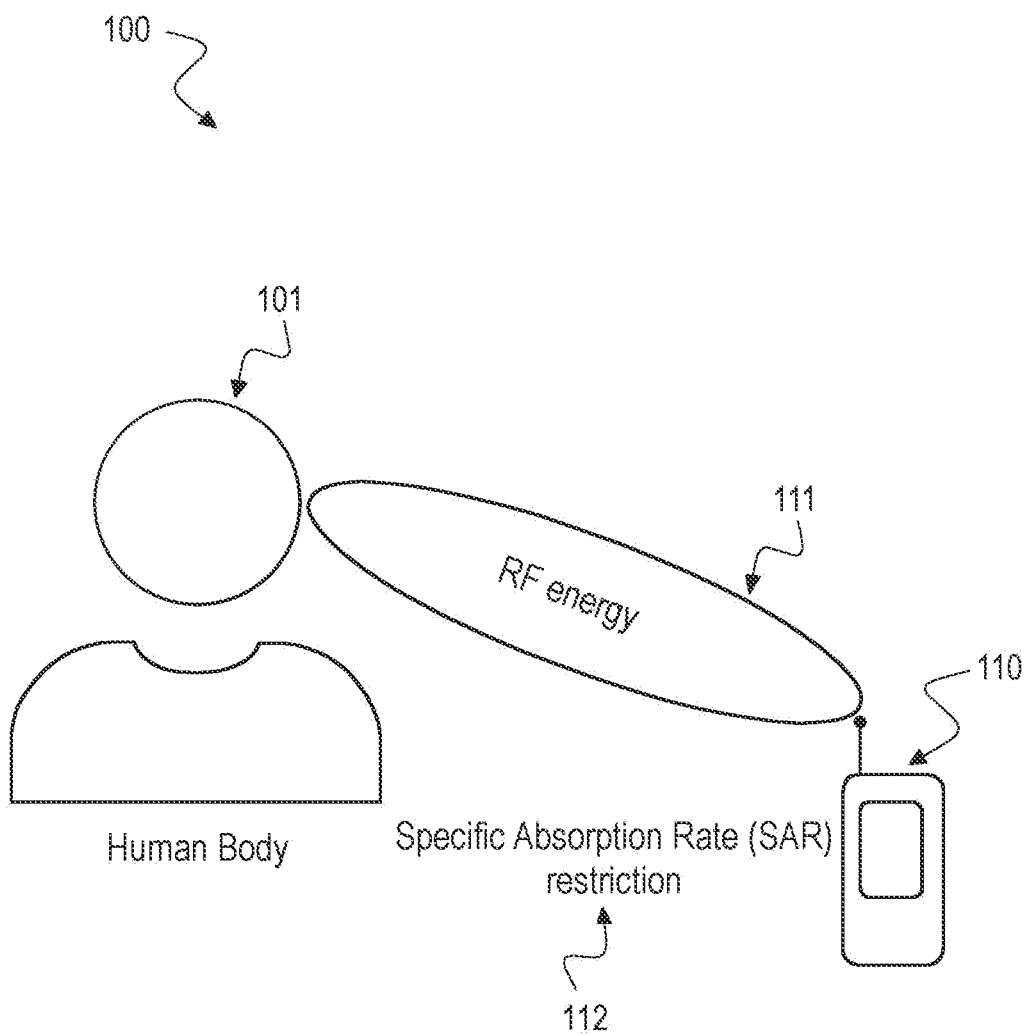
FIG. 1 is a schematic diagram illustrating RF energy absorption by a human body 101 and a SAR restriction 112.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
  SAR: Specific Absorption Rate
  TX: Transmission
  AQ: Assigned Quota
  UQ: Unused Quota
  CQ: Cumulative Quota
  LQ: Link Quality
  SA: Stand-Alone mode
  SH: Shared Transmission mode
  AP: Activity Percentage
  AF: Activity Factor
  CDB: Concurrent Dual Band
  MA: Moving Average
  RF: Radio Frequency It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The techniques described herein may be implemented in wireless communication networks, in particular communication networks based on mobile communication standards such as LTE, in particular LTE-A and/or OFDM and successor standards such as 5G. The methods are also applicable for high speed communication standards from the IEEE 802.11 family, e.g. 802.11ac, ax, ad and future IEEE 802.11 amendments. The methods are further applicable to on-device radio transmitters compliant to or designed in accordance with other wireless standards such as IEEE 802.15, the Bluetooth Special Interest Group, or even proprietary wireless transmitter specifications. The methods and devices described below may be implemented in electronic devices such as cellular handsets, Tablets, Laptops, and mobile or wireless devices. Note that SAR is particularly relevant for devices held in proximity to the body such as cellular handsets, Tablets, Laptops, and mobile or wireless devices but less relevant to infrastructure devices such as access points or base stations as they are not held in proximity to the body. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

In the following, radio frequency (RF) signals and transmission of radio energy are described. Radio signals may be or may include radio frequency signals radiated by a radio transmitting device (referred hereinafter as a radio device or a radio entity) with a radio frequency lying in a range of about 3 kHz to about 300 GHz. The frequency range may correspond to frequencies of alternating current electrical signals used to produce and detect radio waves.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

FIG. 1 is a schematic diagram 100 illustrating RF energy absorption by a human body 101 and a SAR restriction 112. SAR—Specific Absorption Rate, is a measure of the amount of RF energy 111 absorbed by the body 101 when using a mobile device 110 such as a phone or a tablet. In order to comply with SAR requirements a restriction 112 (backoff) shall be applied on the maximal TX power permitted for a specific radio of the device 110. Note that the SAR requirement is for the maximum allowed transmission (Tx) power; a backoff is one way to relate to this restriction in the context of backoff from maximum (HW supported) Tx power. Other ways to relate to this restriction are applicable as well. When the device 110 has an antenna capable of transmitting concurrently at multiple frequency bands or if it has multiple radios that emit energy 111 in close physical proximity such that the SAR restriction 112 is applied on all of them together an additional backoff must be taken on the TX power of each radio entity. The resulting TX power from all applied backoffs yields a poor wireless performance for each participating radio.

Existing SAR solutions derive a fixed worst-case backoff value per each radio/band where that backoff needs to account for the case where all radios are transmitting concurrently. Alternatively, existing solutions shall forbid any concurrency between multiple radio technologies under SAR constraints.

Since the worst-case backoff will be applied by the radio entity regardless of the level of activity of other wireless technologies, this may result in an unnecessarily poor wireless performance. As an example, if a radio is permitted to transmit at 19 dBm, and needs to reduce its TX power to 15 dBm under SAR constraint 112, then if that radio could also participate in a Concurrent Dual Band (CDB) scenario it would need to apply an additional backoff of up to 3 dB resulting in TX power of 12 dBm applied on all its transmissions—this may cause a severe range problem. Alternatively, if TX concurrency between multiple radios is prohibited severe degradation in user experience may result.

Figure 2:
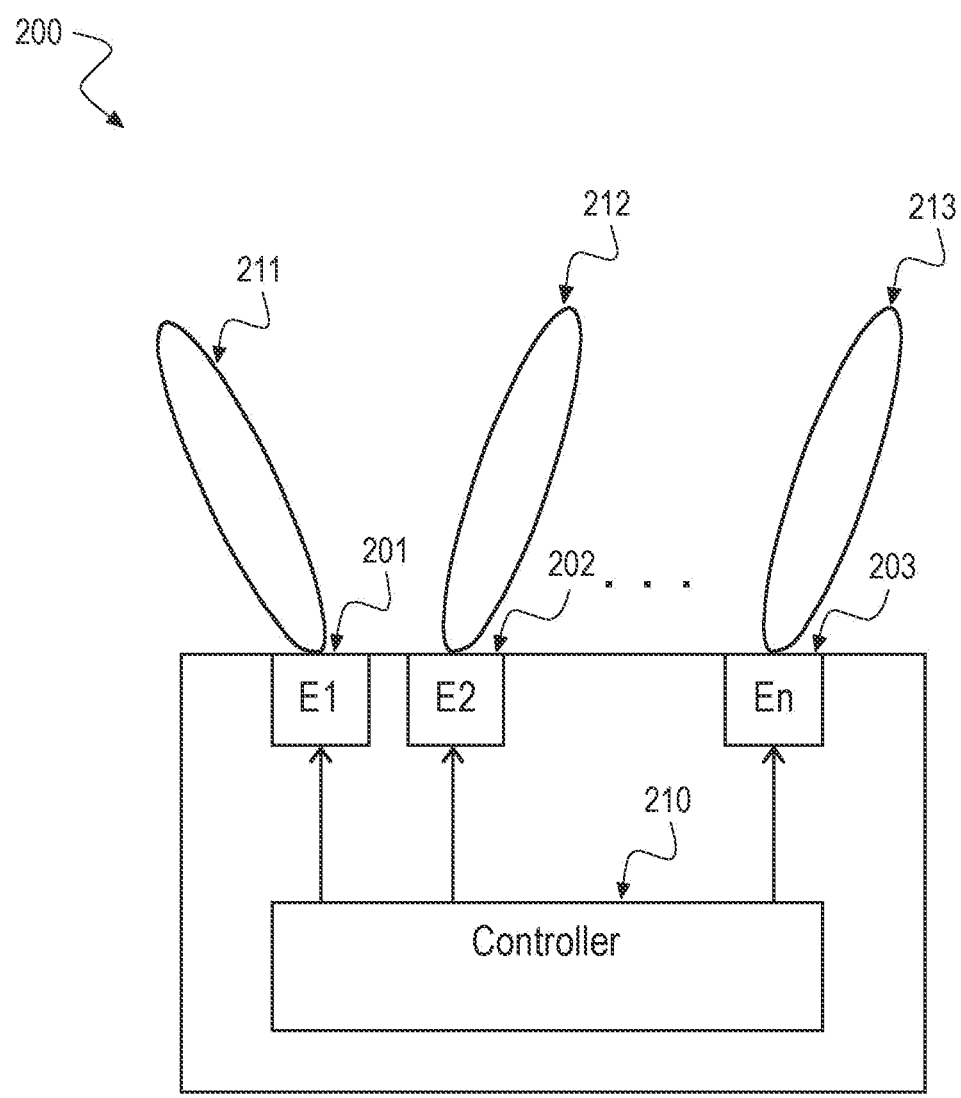
FIG. 2 is a block diagram illustrating a radio device 200 with a plurality of radio entities 201, 202, 203 according to the disclosure.

FIG. 2 is a block diagram illustrating a radio device 200 with a plurality of radio entities 201, 202, 203 according to the disclosure.

The radio device 200 comprises a plurality of radio entities 201, 202, 203 configured to transmit radio energy 211, 212, 213. The radio device 200 further comprises a controller 210 that is configured to control the radio energy 211, 212, 213 transmission of the plurality of radio entities 201, 202, 203 to comply with a predefined Specific Absorption Rate, SAR, requirement. The controller 210 is further configured to enable at least two radio entities (e.g. 201, 202) of the plurality of radio entities operating concurrently based on a shared SAR transmission power restriction which allows the at least two radio entities transmitting concurrently at a predefined duty cycle, e.g. at 100% duty cycle, without violating the SAR requirement.

The controller 210 may further be configured to enable at least one radio entity (e.g. 201) of the plurality of radio entities operating in stand-alone mode based on a stand-alone SAR transmission power restriction which allows the at least one radio entity transmitting at a predefined duty cycle, e.g. at 100% duty cycle, without violating the SAR requirement.

Thus, the radio device may operate in a first mode where two or more radio entities operate concurrently and where the shared SAR transmission power restriction is fulfilled; and the radio device may operate in a second mode where each radio entity operates in stand-alone mode where the stand-alone SAR transmission power restriction is fulfilled for each radio entity.

The shared SAR transmission power restriction may be based on a SAR budgeting scheme. The shared SAR transmission power restriction may be configured to restrict transmission times of the at least two radio entities within a specific time window to predefined quotas, e.g. as described below with respect to FIGS. 3 to 5 in more detail. The predefined quotas may be specified as percentage values of the specific time window. The specific time window may be less than a period over which the SAR requirement is defined.

The controller 210 may be configured to assign time quotas to the plurality of radio entities over a single time window, e.g. as described below with respect to FIGS. 3 to 5 in more detail. Alternatively, the controller 210 may be configured to assign time quotas to the plurality of radio entities over multiple time windows, e.g. as described below with respect to FIGS. 3 to 5 in more detail.

Alternatively, the controller 210 may be configured to assign transmission power quotas to the plurality of radio entities 201, 202, 203, e.g. as described below with respect to FIG. 5 in more detail. The controller 210 may be configured to assign the transmission power quotas based on a moving average filter, e.g. as described below with respect to FIG. 5 in more detail.

The controller 210 may be configured to apply a strict duty cycling scheme in which within a specific period each transmission is followed by a quiet period to guarantee the predefined duty cycle.

The controller 210 may be configured to apply a flexible quota scheme in which for a given time window and a given quota a cumulative transmission time within the time window shall not exceed a threshold. The threshold may be a function of the quota and the time window, in particular a product of the quota and the time window, e.g. as described below with respect to FIGS. 3 to 5 in more detail.

The controller 210 may be configured to enable a radio entity of the plurality of radio entities 201, 202, 203 increasing its transmission power to a power level above a given stand-alone SAR transmission power restriction when the radio entity is correspondingly decreasing its transmission power thereafter to fulfill the standalone SAR transmission power restriction within a given time window. The power level may correspond to the standalone SAR transmission power restriction divided by an activity percentage of the radio entity within the time window, e.g. as described below with respect to FIGS. 3 to 5 in more detail.

The controller 210 may be configured to control the energy transmission of the plurality of radio entities 201, 202, 203 based on averaging over activities of the plurality of radio entities within a measurement window, e.g. as described below with respect to FIGS. 3 to 5 in more detail.

The controller 210 may be configured to allow overlapping activities of the at least two radio entities as long as a cumulative activity across all radio entities 201, 202, 203 of the plurality of radio entities is below a threshold within a measurement window.

In the following an exemplary solution implemented by the controller 210 is described in more detail. The solution is based on allocating a quota of TX activity for each participating radio (entity) 201, 202, 203 that is applicable within a specific time window. A quota defines an energy budget (Power×Time) for the radio 201, 202, 203 over that window. Using smart management of quota allocation over consecutive windows and or sliding windows allows achieving an optimal solution that does not sacrifice TX power while still fully complying with SAR requirements.

The solution allows customers to operate multiple radio technologies concurrently over the same SAR antenna without requiring an additional backoff on the TX power of each radio due to this concurrency and without severe restrictions on the timing of TX operations. This becomes possible by leveraging the sporadic nature of TX traffic as well as the method in which SAR is being measured. Note that the SAR requirement is for the maximum allowed transmission (Tx) power; a backoff is one way to relate to this restriction in the context of backoff from maximum (HW supported) Tx power. Other ways to relate to this restriction are applicable as well.

Such capability is of special interest for SAR-constrained CDB (Concurrent Dual Band) solutions as well as WLAN+LAA sharing solutions which shall become important technologies to support in wireless products in the next years.

Depending on the Device Form-Factor SAR measurement and budgeting is either performed on each antenna separately or on multiple antennas together. The solution is applicable to both cases. An example for single antenna is when WIFI 2.4 GHz Band and WIFI 5 GHz Band are transmitting over the same antenna. An example for more than one antenna is when multiple antennas on the device are in close physical proximity such that a single SAR constraint is applicable to all. Other examples are WIFI 5 GHz and LAA (License Assisted Access—i.e. LTE within 5 GHz Band) radios that may share the same antenna or WIFI 2.4 GHz and Bluetooth.

In order to participate in SAR budgeting scheme each radio entity 201, 202, 203 shall support a method to restrict its transmission time and or power within a specific time window to a pre-defined quota specified as a percentage of that window. In order to comply with the allocated quota, the radio entity 201, 202, 203 may deploy either a strict duty cycling scheme in which within a specific period each transmission is followed by a quiet period that guarantees a predefined duty cycle (e.g. N msec of TX is followed by 2N msec of quiet time to guarantee a duty cycle of N/(N+2N) =33.3%) or it may be able to deploy a more flexible quota scheme based on a TX counter in which for any given quota (e.g. Q=30%) and a Time Window (e.g. T=100 ms) the cumulative transmission time of the radio within that time window shall not exceed Q*T (30 ms).

In general, each radio (entity) 201, 202, 203 shall be assigned with a SAR TX power restriction that is applicable when the radio is operating in Stand-Alone mode (SA_SAR_POWER) and another Shared SAR TX power restriction that is applicable when all radio-entities are operating concurrently (SH_SAR_POWER).

The SA_SAR_POWER restriction allows a single radio (e.g. 201) to transmit at 100% duty-cycle without violating SAR. Like-wise, the SH_SAR_POWER restriction allows all radio entities 201, 202, 203 to transmit concurrently at 100% duty-cycle without violating SAR.

By leveraging the physical nature of SAR and the way it is measured it can be observed that a radio may increase its TX power beyond SA_SAR_POWER and still comply with SAR as long it proportionally decreases its activity time within the measurement window. In other words, let AP be the Activity Percentage within a window with values in the range [0 . . . 1], then a radio may transmit at a Power value of SA_SAR_POWER/AP within that window without violating SAR—as long as the window size is small enough (i.e. significantly smaller than the SAR measurement period).

This idea can be scaled for multiple radios case by averaging the activity of multiple radios within a measurement window. Since any radio has an SA_SAR_POWER that guarantee SAR compliancy with 100% duty cycle also any superposition of radio activities (Radio A is active for X msec then radio B is active for Y msec) is compliant with SAR. Due to the physical nature of SAR it can also be claimed that the activity periods of the multiple radio can overlap without violating SAR as long as the cumulative activity across all radios 201, 202, 203 within the window is below or equal to 100%. Such an overlap may create a temporal crossing of the maximum allowed cumulative TX power, however since SAR is measured over a period which is longer than the time window in practice no SAR violation occurs.

Several mechanisms are introduced in the following with respect to FIGS. 3 to 7 to leverage the above observations. Using centralized radio management (central controller 210) a method can be formed that allows optimizing the TX power of all radio entities 201, 202, 203 based on their specific requirements while complying with the overall SAR budget of the system.

The central controller 210 can track TX activity of each radio 201, 202, 203 as well as the Link Quality of each radio 201, 202, 203 and make allocation decisions based on that information. Link Quality can be defined either as the success rate for sending TX packets over a period of time as tracked by the packet acknowledge rate or as using another approximation such as the MCS that the radio is using (lower MCS indicates lower link quality).

The controller 210 can use one of the methods described in the following with respect to FIGS. 3 to 5 to manage the SAR budget.

Figure 3:
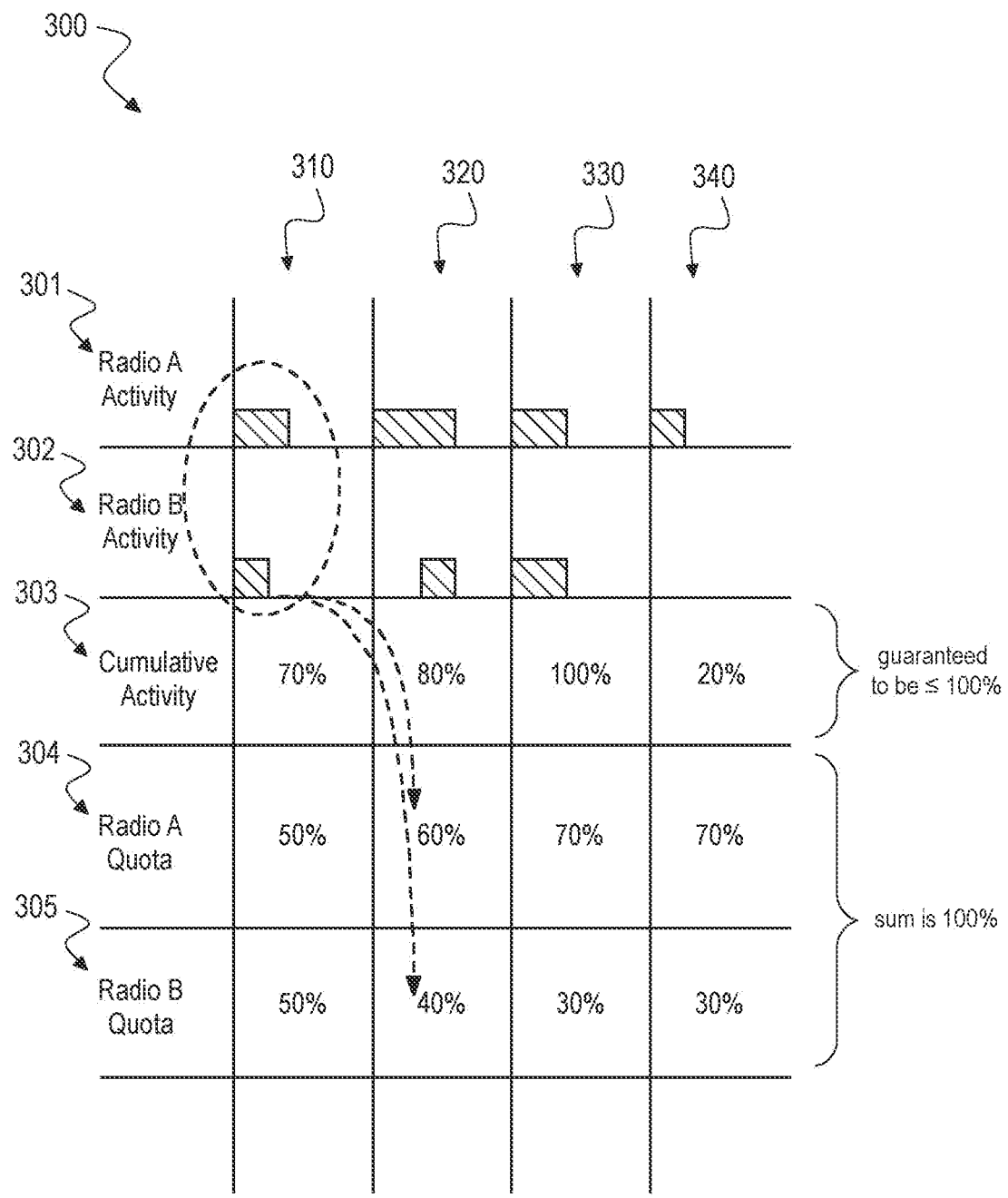
FIG. 3 is a schematic diagram illustrating a first method 300 for managing the SAR budget according to the disclosure.

FIG. 3 is a schematic diagram illustrating a first method 300 for managing the SAR budget according to the disclosure. This first method is related to managing Time Quota over single window. An exemplary number of two radio entities (denoted A and B, e.g. corresponding to 201 and 202 in FIG. 2) is illustrated which produce Radio A activity 301 and Radio B activity 302. A and B may also specify different frequency bands in which two radio entities transmit radio energy. FIG. 3 depicts Radio A activity 301, Radio B activity 302, Cumulative Activity 303, Radio A Quota 304, Radio B Quota 305 in different time intervals (or time windows) 310, 320, 330, 340.

In this method 300 each radio entity is assigned with a Quota Qi (see Radio A Quota 304 and Radio B Quota 305 in FIG. 3) for performing transmissions within a time window, specified as a percentage of the Window's Time duration WT. The radio can manage the budget by initializing a counter to the value Qi*WT when the window starts then decrementing the counter by the TX Time TT of each packet. Packet transmission is permissible only if counter value is bigger than TT. The radio may either exhaust all its quota or only a portion of it. At the end of the window the central controller (e.g. controller 210 depicted in FIG. 2) will capture the remaining budget in all counters of all radios and adjust the Quota for next window according to the algorithm specified below. An example algorithm that may be used by the central controller to allocate Quota:

1. Assigned Quotas for all radios (AQi) is always allocated such that Σ(AQi)=<100%.
2. Initially Quota is split evenly among the radios (e.g. AQ1=50%, AQ2=50%)
3. After one window is over the controller will collect the following information from each radio:
   a. Unused Quota (UQ)—the remaining quota upon end of window
   b. Link Quality—as defined above
4. If ΣUQi>0:
   a. If all radios have UQi>0—no change in quotas.
   b. If some radios (e.g. radio 1) have UQi=0 and other radios (e.g. radio 2) have UQi>0: decrease the quota of radio 2 by 50%*UQ2 and increase the quota of radio 1 by the same amount.
5. Otherwise (ΣUQi=0):
   a. the controller will check if current quotas should be adjusted using the following algorithm:
      i. If there is a radio with AQi<(100%/num_of_radios) and LQ<Thresh set AQi=(100%/num_of_radios) for that radio and decrease the AQ of all other radios accordingly.
      ii. The above will allow radios that are not getting a fair share of the quota and suffer from low Link Quality to gain back their share.
6. Repeat Using Method1 all radios can continue transmitting using SA_SAR_POWER and need not suffer the additional power backoff implied by SH_SAR_POWER.

The diagram in FIG. 3 depicts a sequence in which Method 1 is applied to manage the quota of two Bands. Since Band B does not use its quota the central controller gradually increases the allocated quota for Radio A.

Figure 4:
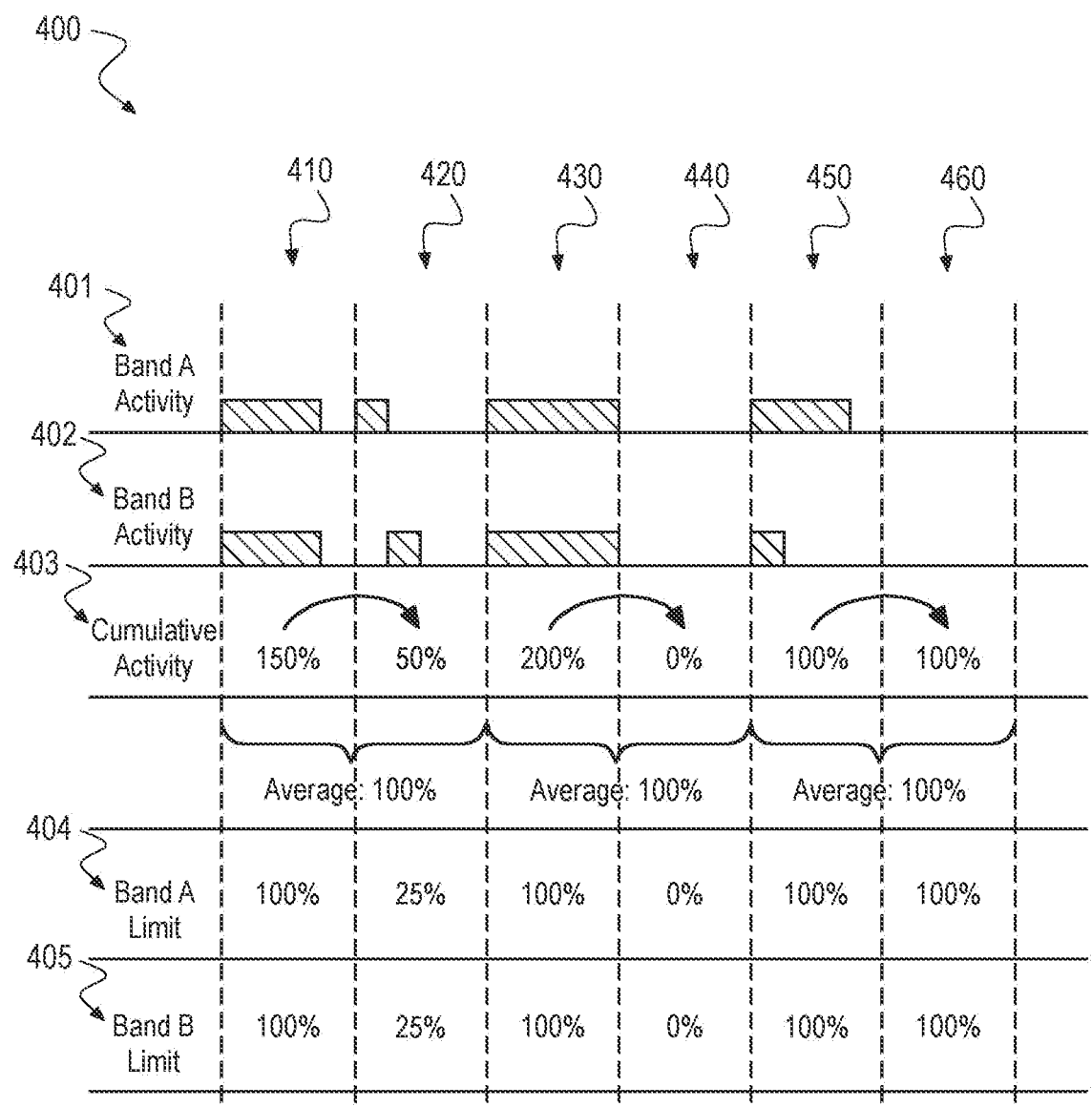
FIG. 4 is a schematic diagram illustrating a second method 400 for managing the SAR budget according to the disclosure.

FIG. 4 is a schematic diagram illustrating a second method 400 for managing the SAR budget according to the disclosure. This second method is related to managing Time Quota over multiple windows. An exemplary number of two radio entities (denoted A and B, e.g. corresponding to 201 and 202 in FIG. 2) is illustrated which produce Radio A activity 301 and Radio B activity 302. A and B may also specify different frequency bands in which two radio entities transmit radio energy. FIG. 4 depicts Radio A activity 401, Radio B activity 402, Cumulative Activity 403, Band A Limit 404, Band B Limit 405 in different time intervals (or time windows) 410, 420, 430, 440, 450, 460.

Method 2 describes an optimized version of Method 1 (shown in FIG. 3) working in window-pairs—where on the first window 410 each radio shall be assigned with an "unrestricted quota" of 100% and on the next window 420 an adjustment is done to compensate for any budget violations occurring on previous window 410. The advantage of this version is that it does not restrict in advance the quota of each radio while still complying with the overall SAR budget measured across the two windows.

The diagram shown in FIG. 4 depicts the flow when Method 2 is used. As can be seen on the first window 410 each band is assigned with a quota of 100%. During the window period the cumulative activity 403 of both bands is 150%—in order to compensate for that, on the second window 420 the cumulative budget 403 is dropped to 50% (split evenly among the two bands) hence no violation is observed when measuring SAR over the two windows 410, 420. On the next window 430 the budget is again 100% per band—and since each band uses its entire budget it drops to 0% on the next window 440.

In practice this method allows both bands to transmit freely within each window with no quota enforcement as long as their cumulative activity 403 does not cross 100%.

With Method 2, the central controller (e.g. controller 210) can use the following exemplary algorithm to allocate quotas for each window:

1. For window1:
   a. Assign a quota of 100% for each radio
   b. After window1 is over collect the following information from each radio:
      i. Link Quality (LQ)—as defined above
      ii. Activity Factor (AF)—this is the activity rate during window 1—calculated as TX Time/Window Time
2. For window2:
   a. Calculate Cumulative Quota (CQ) for window2 as:

$CQ=200\%-\Sigma AFi$ b. Allocate an Activity Quota for each radio under the constraint that Σ(AQi)=CQ using one of the following methods:
      i. Symmetric allocation—the remaining quota is split evenly among the radios: AQi=(1/num_of_radios)*CQ
      ii. Proportional allocation—the remaining quota is split such that radios with higher activity receive higher quota on next window: AQi=(AFi/ΣAFi)*CQ
      iii. Link Quality based allocation—the remaining quota shall be split such that radios with a lower Link Quality shall receive a higher quota while keeping the constraint that Σ(AQi)=CQ.
3. Repeat An optimization that can be applied to Method 2 is for the algorithm to perform the averaging over more than 2 windows in order to smooth the traffic pattern. For example, averaging over 3 windows will guarantee that there is never a single window during which no TX is allowed.

Figure 5:
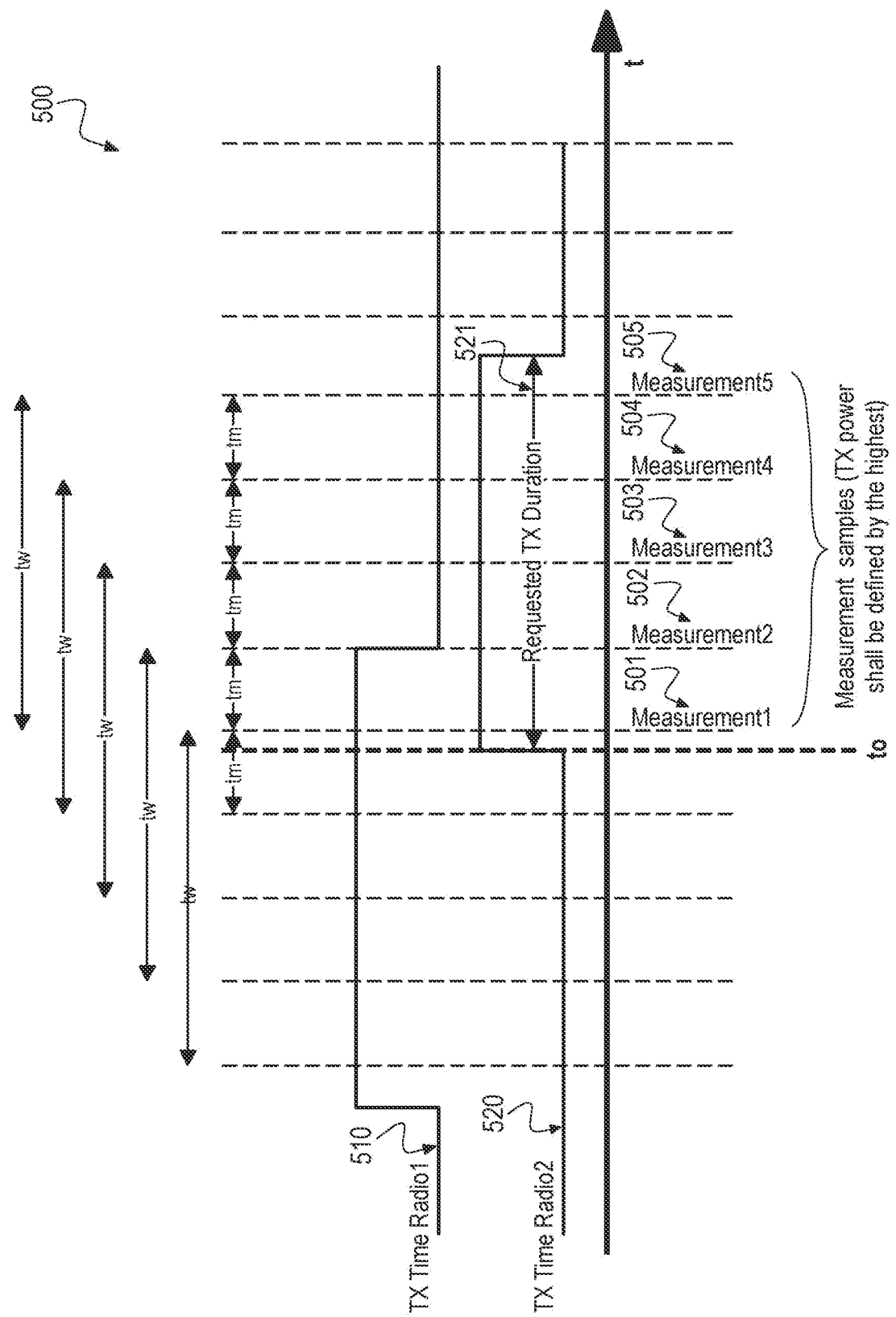
FIG. 5 is a time diagram 500 illustrating measurement points used in a third method for managing the SAR budget according to the disclosure.

FIG. 5 is a time diagram 500 illustrating measurement points used in a third method for managing the SAR budget according to the disclosure. This third method is related to managing TX Power Quota using Moving Average Filter. An exemplary number of two radio entities (denoted Radio 1 and Radio 2, e.g. corresponding to 201 and 202 in FIG. 2) is illustrated. FIG. 4 depicts TX time 510 for Radio 1 and TX time 520 for Radio 2. For Radio 2 different exemplary measurement samples 501, 502, 503, 504, 505 are illustrated during a requested TX duration 521 for which TX power shall be defined by the highest measurement sample.

Method 3 describes a different method to ensure that the total average TX power over any window of length $t_w$ does not surpass the SAR budget. This method is based on tracking the Moving Average (MA) of the cumulative TX power of all participating radios over a window of size $t_w$.

Method 3 applies the dynamic SAR restriction on the TX power rather than the transmission time. Tracking the cumulative TX power of all radios over a relevancy window is done using an MA (Moving Average) filter that estimates the effective SAR due to the radio transmissions over time. In this scheme, the controller (e.g. controller 210 depicted in FIG. 2) measures the TX power of each radio during short time intervals ($t_m$—measurement interval, e.g. 100 uSec) and continuously calculates the effective SAR using a Moving Average filter such as:

$$SAR\_POWER[n]=(1-\alpha)SAR\_POWER[n-1]+\alpha\Sigma TXi[n];$$

with $\alpha$ set to be $t_m/t_w$, where $t_m$ is the measurement interval, and $t_w$ is the time window. $\Sigma TXi[n]$ is the sum of average TX power of all radios during current the current (n-y) $t_m$ measurement window.

While the filter equation above is a $1^{st}$ order ARMA (IIR) filter, the SAR POWER value can be calculated using as a FIR MA filter or as an IIR ARMA filter.

The device shall restrict the power of new transmissions to comply with the SAR budget across $t_w$ as follows: For any new transmission request, the controller shall set the allowed TX power for it in a way that guarantees that the resulting SAR in any time window of length $t_w$ containing the transmission does not surpass the allowed quota.

The central controller shall maintain a list of all active transmitting radios, with their specific max TX power, TX start time and TX duration and will calculate the allocated TX power for a new transmission that starts at time to using the following formula:

Let_ESTIMATED_SAR($t$) be SAR_POWER($t$),
where $t$ is a number in the range $\{t_0, t_0+\min(t_w, \text{requested\_tx\_duration}\}$, in increments of $t_m$.

Then max TX power allowed for the new transmission will be calculated as:

MAX_TX_POWER=Min{$t$ as defined above,(MAX_SAR-ESTIMATED_SAR($t$))}, where MAX_SAR is the maximal allowed cumulative TX Power for all participating radios that guarantees no violation of the SAR budget.

Figure 6:
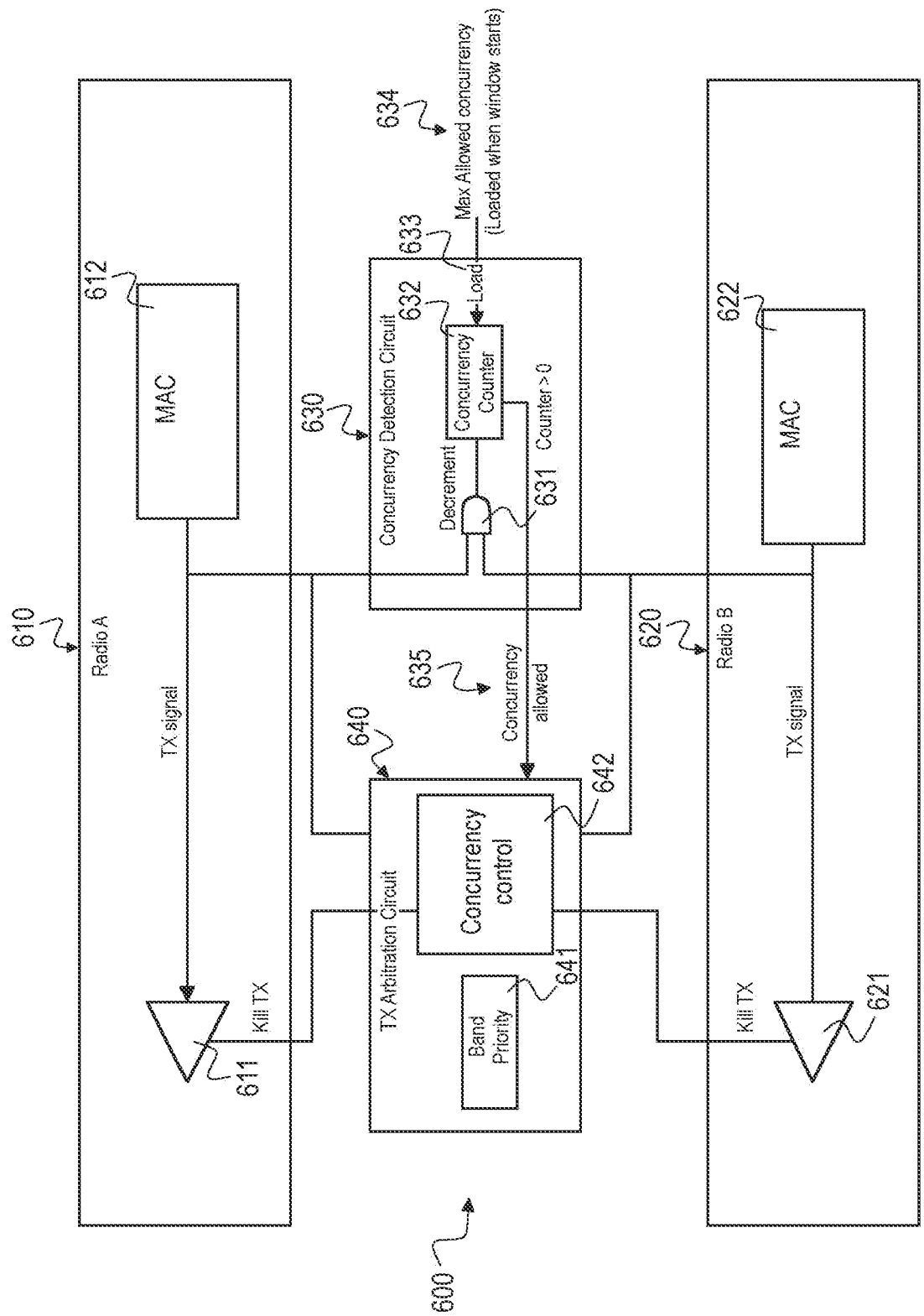
FIG. 6 is a block diagram illustrating a hardware circuit 600 for controlling concurrent radio energy transmissions according to the disclosure.

The diagram shown in FIG. 6 illustrates an example of the measurement points 501, 502, 503, 504, 505 that will be used for resolving the Max TX power in method 3:

Method 1 (shown in FIG. 3) and Method 2 (shown in FIG. 4) imply that there are periods during which both radios transmit concurrently using their SA_POWER rather than their SH_POWER. While this temporal violation is compensated over the measurement window, some regulatory bodies may require a restriction on the maximal period where such concurrency is permitted. The HW circuit 600 shown in FIG. 6 can be used for restricting the maximal amount of concurrency within a given measurement window.

FIG. 6 is a block diagram illustrating a hardware circuit 600 for controlling concurrent radio energy transmissions according to the disclosure. The hardware circuit 600 can be used for Quota allocation with hardware restriction of maximal concurrency.

The hardware circuit 600 comprises an exemplary number of two radio entities (Radio A 610 and Radio B 620). The hardware circuit 600 comprises a concurrency detection circuit 620 in which a concurrency counter 632 is implemented which counts concurrent transmissions of radio A and Radio B. A maximum allowed concurrency value 634 can be loaded 633 to counter 632 which forms a threshold for the counter 632. An AND gate 631 passes concurrent transmissions of both radios 610, 620 to the counter 632. The transmissions of each radio 610, 620 are measured after the MAC 612, 622 of each radio entity 610, 620 and before transmitter 611, 621. If counter 632 is greater zero, concurrency is allowed 635 which is signaled to TX arbitration circuit 640. TX arbitration circuit includes a concurrency control block 642 which detects if both bands are transmitting and concurrency is not allowed. If this condition is fulfilled, the transmission of the band with lower priority is killed. Priorities are determined by band priority block 641.

The hardware circuit 600 can be implemented in a radio device, e.g. a radio device 200 described above with respect to FIG. 2. The radio device comprises a plurality of radio entities 610, 620 (e.g. corresponding to entities 201, 202, 203 in FIG. 2) configured to transmit radio energy, e.g. as described above with respect to FIGS. 1 to 5. The radio device includes a concurrency detection circuit 620 configured to detect concurrent transmissions of at least two radio entities of the plurality of radio entities 610, 620. The radio device further includes a transmission arbitration circuit 640 configured to disable transmission of at least one radio entity of the at least two concurrently transmitting radio entities based on a concurrency criterion 642.

The concurrency criterion 642 may be based on a Specific Absorption Rate, SAR, requirement. The concurrency detection circuit 620 may be configured to count concurrent transmissions of the at least two radio entities 610, 620 within a measurement interval. The concurrency detection circuit 620 may be configured to indicate a concurrency allowance 635 to the transmission arbitration circuit 640 if the counted concurrent transmissions are below a threshold.

The transmission arbitration circuit 640 may be configured to disable transmission of the at least one radio entity of the at least two concurrently transmitting radio entities if the concurrency detection circuit 620 stops indicating concurrency allowance 635.

The transmission arbitration circuit 640 may be configured to disable transmission of the at least one radio entity of the at least two concurrently transmitting radio entities based on priorities 641 of the at least two concurrently transmitting radio entities 610, 620. The priorities 641 may be based on strict priority to one of the radio entities 610, 620, strict priority based on access category and/or Round Robin between the radio entities 610, 620.

In the following a functionality of the hardware circuit 600 is described in more detail. At the beginning of each window a counter 632 is initialized to the max time allowed for concurrent transmission within that window (MAX_ALLOWED_CONCURRENCY). During the window, counter 632 is decremented whenever both radios 610, 620 are transmitting in each tick. Once counter 632 is reaching zero an arbitration logic 640 is armed. The arbitration logic 640 will kill the transmission of the radio with the lower priority whenever the other radio is active. The priority 641 can be defined as either strict priority to one of the bands, strict priority based on Access Category or Round Robin with between the two bands per TX packet.

By controlling the value of MAX_ALLOWED_CONCURRENCY the behavior is tuned to be either a real-TDM between the radios (zero concurrency), full concurrency or a hybrid mode of operation in which quotas are enforced within the window while he overall concurrency time is restricted.

Since Method 3 (described above with respect to FIG. 5) makes TX power decisions one at a time, it may be that a high priority TX request may require a TX power higher than permitted by the method. In this case, the central controller may use the HW circuit 600 described above to "kill" a lower priority TX activity such that its power budget may then be assigned to the high priority TX request. It should be noted that for Method 3, the central controller may be provided in advance the inputs regarding any pre-assigned Tx activity on any of the radios, to allow for a "forecasting" calculation of allowed Tx powers, to comply with the SAR requirements.

Figure 7:
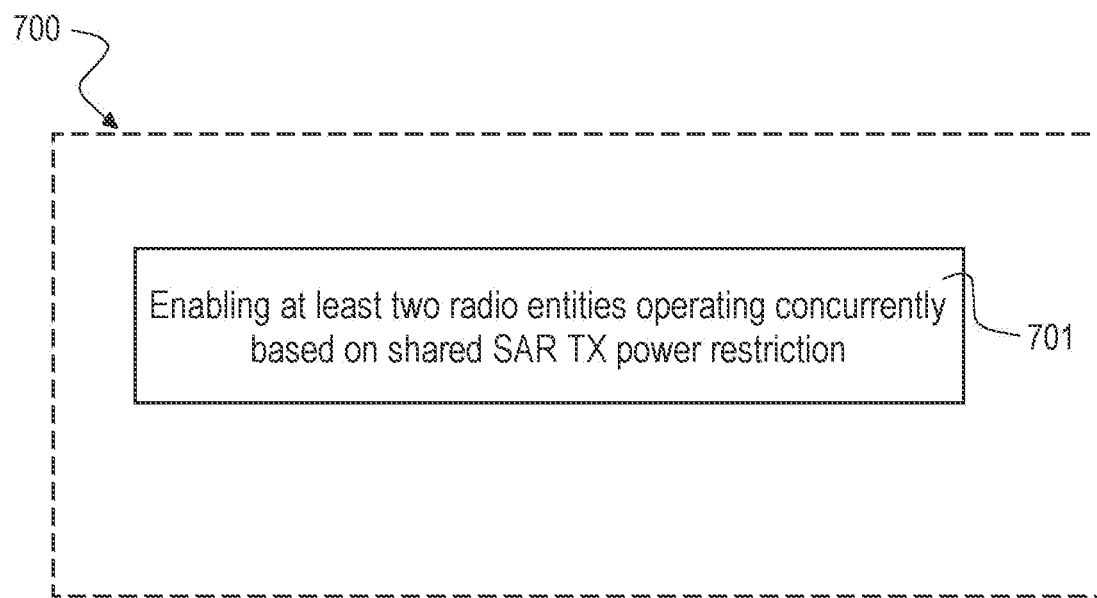
FIG. 7 is a schematic diagram illustrating a method 700 for controlling radio energy transmissions according to the disclosure.

FIG. 7 is a schematic diagram illustrating a method 700 for controlling radio energy transmissions according to the disclosure.

The method 700 allows controlling radio energy transmission of a plurality of radio entities, e.g. entities 201, 202, 203 as shown in FIG. 2 or entities 610, 620 as shown in FIG. 6, to comply with a predefined Specific Absorption Rate, SAR, requirement. The method 700 comprises: enabling 701 at least two radio entities of the plurality of radio entities operating concurrently based on a shared SAR transmission power restriction which allows the at least two radio entities transmitting concurrently at a predefined duty cycle, in particular at 100% duty cycle, without violating the SAR requirement.

The method 700 may further comprise: enabling at least one radio entity of the plurality of radio entities operating in stand-alone mode based on a stand-alone SAR transmission power restriction which allows the at least one radio entity transmitting at a predefined duty cycle, in particular at 100% duty cycle, without violating the SAR requirement.

The shared SAR transmission power restriction may be based on a SAR budgeting scheme.

The method 700 may further comprise: restricting transmission times of the at least two radio entities within a specific time window to predefined quotas. The predefined quotas may be specified as percentage values of the specific time window. The specific time window may be less than a period over which the SAR requirement is defined.

The method 700 may further comprise: assigning time quotas to the plurality of radio entities over a single time window, e.g. as described above with respect to FIG. 3. Alternatively, the method 700 may comprise: assigning time quotas to the plurality of radio entities over multiple time windows, e.g. as described above with respect to FIG. 4.

The devices and systems described in this disclosure may be implemented as Digital Signal Processors (DSP), microcontrollers or any other side-processor or hardware circuit on a chip or an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the methods 300, 400, 500, 700 described above with respect to FIGS. 3 to 5 and 7 and the computing blocks described above with respect to FIGS. 2 and 6. Such a computer program product may include a non-transient readable storage medium storing program code thereon for use by a processor, the program code comprising instructions for performing the methods or the computing blocks as described above.

EXAMPLES

The following examples pertain to further embodiments. Example 1 is a radio device, comprising: a plurality of radio entities configured to transmit radio energy; and a controller configured to control the radio energy transmission of the plurality of radio entities to comply with a predefined Specific Absorption Rate, SAR, requirement, wherein the controller is configured to enable at least two radio entities of the plurality of radio entities operating concurrently based on a shared SAR transmission power restriction which allows the at least two radio entities transmitting concurrently at a predefined duty cycle, in particular at 100% duty cycle, without violating the SAR requirement.

In Example 2, the subject matter of Example 1 can optionally include that the controller is further configured to enable at least one radio entity of the plurality of radio entities operating in stand-alone mode based on a stand-alone SAR transmission power restriction which allows the at least one radio entity transmitting at a predefined duty cycle, in particular at 100% duty cycle, without violating the SAR requirement.

In Example 3, the subject matter of any one of Examples 1-2 can optionally include that the shared SAR transmission power restriction is based on a SAR budgeting scheme.

In Example 4, the subject matter of any one of Examples 1-2 can optionally include that the shared SAR transmission power restriction is configured to restrict transmission times of the at least two radio entities within a specific time window to predefined quotas.

In Example 5, the subject matter of Example 4 can optionally include that the predefined quotas are specified as percentage values of the specific time window.

In Example 6, the subject matter of Example 4 can optionally include that the specific time window is less than a period over which the SAR requirement is defined.

In Example 7, the subject matter of Example 4 can optionally include that the controller is configured to assign time quotas to the plurality of radio entities over a single time window.

In Example 8, the subject matter of Example 4 can optionally include that the controller is configured to assign time quotas to the plurality of radio entities over multiple time windows.

In Example 9, the subject matter of Example 4 can optionally include that the controller is configured to assign transmission power quotas to the plurality of radio entities.

In Example 10, the subject matter of Example 9 can optionally include that the controller is configured to assign the transmission power quotas based on a moving average filter.

In Example 11, the subject matter of any one of Examples 1-2 can optionally include that the controller is configured to apply a strict duty cycling scheme in which within a specific period each transmission is followed by a quiet period to guarantee the predefined duty cycle.

In Example 12, the subject matter of any one of Examples 1-2 can optionally include that the controller is configured to apply a flexible quota scheme in which for a given time window and a given quota a cumulative transmission time within the time window shall not exceed a threshold.

In Example 13, the subject matter of Example 12 can optionally include that the threshold is a function of the quota and the time window, in particular a product of the quota and the time window.

In Example 14, the subject matter of any one of Examples 1-2 can optionally include that the controller is configured to enable a radio entity of the plurality of radio entities increasing its transmission power to a power level above a given stand-alone SAR transmission power restriction when the radio entity is correspondingly decreasing its transmission power thereafter to fulfill the standalone SAR transmission power restriction within a given time window.

In Example 15, the subject matter of Example 14 can optionally include that the power level corresponds to the standalone SAR transmission power restriction divided by an activity percentage of the radio entity within the time window.

In Example 16, the subject matter of any one of Examples 1-2 can optionally include that the controller is configured to control the energy transmission of the plurality of radio entities based on averaging over activities of the plurality of radio entities within a measurement window.

In Example 17, the subject matter of any one of Examples 1-2 can optionally include that the controller is configured to allow overlapping activities of the at least two radio entities as long as a cumulative activity across all radio entities of the plurality of radio entities is below a threshold within a measurement window.

In Example 18, the subject matter of any one of Examples 1-2 can optionally include that the controller is configured to stop an ongoing transmission of at least one radio entity in order to allow at least another radio entity to commence transmitting and still meeting the SAR requirement.

Example 19 is a radio device, comprising: a plurality of radio entities configured to transmit radio energy; a concurrency detection circuit configured to detect concurrent transmissions of at least two radio entities of the plurality of radio entities; and a transmission arbitration circuit configured to disable transmission of at least one radio entity of the at least two concurrently transmitting radio entities based on a concurrency criterion.

In Example 20, the subject matter of Example 19 can optionally include that the concurrency criterion is based on a Specific Absorption Rate, SAR, requirement.

In Example 21, the subject matter of any one of Examples 19-20 can optionally include that the concurrency detection circuit is configured to count concurrent transmissions of the at least two radio entities within a measurement interval.

In Example 22, the subject matter of any one of Examples 19-20 can optionally include that the concurrency detection circuit is configured to relate to a Tx power weighted list of concurrent transmissions of the at least two radio entities within a measurement interval.

In Example 23, the subject matter of Example 21 can optionally include that the concurrency detection circuit is configured to indicate a concurrency allowance to the transmission arbitration circuit if the counted concurrent transmissions are below a threshold.

In Example 24, the subject matter of Example 23 can optionally include that the transmission arbitration circuit is configured to disable transmission of the at least one radio entity of the at least two concurrently transmitting radio entities if the concurrency detection circuit stops indicating concurrency allowance.

In Example 25, the subject matter of any one of Examples 19-20 can optionally include that the transmission arbitration circuit is configured to disable transmission of the at least one radio entity of the at least two concurrently transmitting radio entities based on priorities of the at least two concurrently transmitting radio entities.

In Example 26, the subject matter of Example 25 can optionally include that the priorities are based on strict priority to one of the radio entities, strict priority based on access category and/or Round Robin between the radio entities.

Example 27 is a method for controlling radio energy transmission of a plurality of radio entities to comply with a predefined Specific Absorption Rate, SAR, requirement, the method comprising: enabling at least two radio entities of the plurality of radio entities operating concurrently based on a shared SAR transmission power restriction which allows the at least two radio entities transmitting concurrently at a predefined duty cycle, in particular at 100% duty cycle, without violating the SAR requirement.

In Example 28, the subject matter of Example 27 can optionally include: enabling at least one radio entity of the plurality of radio entities operating in stand-alone mode based on a stand-alone SAR transmission power restriction which allows the at least one radio entity transmitting at a predefined duty cycle, in particular at 100% duty cycle, without violating the SAR requirement.

In Example 29, the subject matter of any one of Examples 27-28 can optionally include that the shared SAR transmission power restriction is based on a SAR budgeting scheme.

In Example 30, the subject matter of any one of Examples 27-28 can optionally include: restricting transmission times of the at least two radio entities within a specific time window to predefined quotas.

In Example 31, the subject matter of Example 30 can optionally include that the predefined quotas are specified as percentage values of the specific time window.

In Example 32, the subject matter of Example 30 can optionally include that the specific time window is less than a period over which the SAR requirement is defined.

In Example 33, the subject matter of Example 30 can optionally include: assigning time quotas to the plurality of radio entities over a single time window.

In Example 34, the subject matter of Example 30 can optionally include: assigning time quotas to the plurality of radio entities over multiple time windows.

Example 35 is a device for controlling radio energy transmission of a plurality of radio entities to comply with a predefined Specific Absorption Rate, SAR, requirement, the device comprising: means for enabling at least two radio entities of the plurality of radio entities operating concurrently based on a shared SAR transmission power restriction which allows the at least two radio entities transmitting concurrently at a predefined duty cycle, in particular at 100% duty cycle, without violating the SAR requirement.

In Example 36, the subject matter of Example 35 can optionally include: means for enabling at least one radio entity of the plurality of radio entities operating in stand-alone mode based on a stand-alone SAR transmission power restriction which allows the at least one radio entity transmitting at a predefined duty cycle, in particular at 100% duty cycle, without violating the SAR requirement.

Example 37 is a radio system, comprising: a plurality of radio entities configured to transmit radio energy; a concurrency detection circuit configured to detect concurrent transmissions of at least two radio entities of the plurality of radio entities; and a transmission arbitration circuit configured to disable transmission of at least one radio entity of the at least two concurrently transmitting radio entities based on a concurrency criterion.

In Example 38, the subject matter of Example 37 can optionally include that the concurrency criterion is based on a Specific Absorption Rate, SAR, requirement.

Example 39 is a computer readable non-transitory medium on which computer instructions are stored which when executed by a computer cause the computer to perform the method of any one of Examples 27 to 34.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A radio device, comprising:
a plurality of radio entities configured to transmit radio energy; and
a controller communicatively coupled to the plurality of radio entities and configured to:
assign first time quotas to the plurality of the radio entities for transmission of radio energy during a first time window,
cause the plurality of radio entities to respectively transmit radio energy for first durations less than or equal to the first time quotas,
assign, in response to the first durations and the first time quotas of the first time window, second time quotas to the plurality of radio entities for transmission of radio energy during a second time window, and
cause the plurality of radio entities to transmit radio energy based on the second time quotas.

2. The radio device of claim 1, wherein the second time quotas are determined based on a difference between the first durations and the first time quotas.

3. The radio device of claim 1, wherein a sum of the first durations and the second time quotas is less than or equal to twice a length of the first time window.

4. The radio device of claim 1, wherein the controller is further configured to:
assign third time quotas to the plurality of radio entities for transmission of radio energy during a third time window based on the first durations and the first time quotas, and
cause the plurality of radio entities to transmit radio energy based on the second time quotas.

5. The radio device of claim 1, wherein the second time quotas are different from the first time quotas by half a difference between a first duration of a first radio entity and a first time quota of the first radio entity.

6. The radio device of claim 1, where a first portion of the plurality of radio entities have second quotas greater than the first time quotas, and a second portion of the plurality of radio entities have second quotas less than the first time quotas.

7. A radio device, comprising:
a first radio entity and a second radio entity configured to transmit radio energy; and
a controller communicatively coupled to the first radio entity and the second radio entity and configured to
assign a first time quota to the first radio entity and the second radio entity for transmission of radio energy during a first time window;
cause the first radio entity to transmit radio energy for a first duration less than or equal to the first time quota;
cause the second radio entity to transmit radio energy for a second duration less than or equal to the first time quota;
when the first duration is equal to the first time quota and the second duration is less than the first time quota, assign a second time quota to the first radio entity and a third time quota to the second radio entity for transmission of radio energy during a second time window, the second time quota being greater than the first time quota and the third time quota being less than the first time quota; and
cause the first radio entity to transmit radio energy based on the second time quota and the second radio entity to transmit radio energy based on the third time quota during the second time window.

8. The radio device of claim 7, wherein the controller is further configured to:
when the first duration is less than the first time quota and the second duration is equal to the first time quota, assign the third time quota to the first radio entity and the second time quota to the second radio entity.

9. The radio device of claim 7, wherein a difference between the second time quota and the first time quota is equal to half a difference between the second duration and the first time quota.

10. The radio device of claim 7, wherein a sum of the first duration and the second duration is less than or equal to a length of the first time window.

11. The radio device of claim 7, wherein a sum of the second time quota and the third time quota is equal to a length of the second time window.

12. The radio device of claim 7, wherein the controller is further configured to:
when the first duration and the second duration are less than the first time quota, assign the first time quota to the first radio entity and the second radio entity for transmission during the second time window.

13. A radio device, comprising:
a plurality of radio entities configured to transmit radio energy; and a controller communicatively coupled to the plurality of radio entities and configured to
- assign first time quotas to the plurality of the radio entities for transmission of radio energy during a first time window,
- cause the plurality of radio entities to respectively transmit radio energy for first durations less than or equal to the first time quotas,
- assign second time quotas to the plurality of radio entities for a set of time windows different from the first time window based on first unused time quotas derived from the first durations and the first time quotas, where a sum of the second time quotas is equal to a sum of the first unused time quotas, and
- cause the plurality of radio entities to transmit radio energy based on the second time quotas.

14. The radio device of claim 13, wherein the controller is further configured to calculate the first unused time quotas by subtracting the first durations from the first time quotas.

15. The radio device of claim 13, wherein the second time quotas are proportionately allocated based on the first durations of the plurality of radio entities.

16. The radio device of claim 13, wherein the second time quotas are derived by evenly splitting the sum of the first unused time quotas between the plurality of radio entities.

17. The radio device of claim 13, wherein the second time quotas are allocated based on link qualities of the plurality of radio entities.

18. The radio device of claim 17, wherein the link qualities are success rates of the plurality of radio entities for sending packets over a period of time.

19. The radio device of claim 17, wherein the link qualities are based on a modulation and coding scheme (MCS) used by the plurality of radio entities.

20. The radio device of claim 13, wherein the first time quotas have durations equal to a duration of the first time window.

* * * * *